United States Patent [19]

Fields

[11] Patent Number: 4,561,478
[45] Date of Patent: Dec. 31, 1985

[54] ROUTER JOINTING FIXTURE

[76] Inventor: Leland S. Fields, 1389 Wagon Train Dr., Albuquerque, N. Mex. 87123

[21] Appl. No.: 595,966

[22] Filed: Apr. 2, 1984

[51] Int. Cl.$^4$ ................................................ B27G 5/06
[52] U.S. Cl. ............................ 144/144 R; 144/134 R
[58] Field of Search ............... 144/137, 144 R, 144.5, 144/134 R, 145 R, 145 A, 372; 409/125, 182, 183, 184, 189, 197, 227; 408/49

[56] References Cited

U.S. PATENT DOCUMENTS 2,175,595 10/1939 Ellison .................................. 409/227
3,942,566 3/1976 Schmidt ............................ 144/134 R

FOREIGN PATENT DOCUMENTS 1369896 7/1964 France ................................. 409/189

*Primary Examiner*—W. D. Bray
*Assistant Examiner*—Jorji M. Griffin
*Attorney, Agent, or Firm*—Harvey B. Jacobson; Clarence A. O'Brien

[57] ABSTRACT

A mounting frame is provided including first and second relatively stationarily located support portions disposed on opposite sides of an upstanding reference plane. The first support portion includes a horizontal tabletop for supporting a workpiece and the second portion includes a base guidingly supported from the frame for rectilinear shifting along a horizontal path paralleling the plane, a vertical column vertically shiftable relative to the base, a mount carried by an upper portion of the column and router support structure for supporting a router in horizontal position with its output shaft disposed normal to the aforementioned reference plane and projecting toward the latter. The mount is supported from the upper end of the column for rectilinear shifting in a path normal to the reference plane. The tabletop is adjustable horizontally toward and away from the reference plane and a vertically adjustable support parallels the reference plane and supports a template therefrom engageable by a template follower adjustably supported from the aforementioned mount atop the column. Structure is provided for limiting shifting of the base and mount in both directions relative to the mounting frame and the column and the tabletop includes selectively usable workpiece alignment and auxiliary fence members positionable along the marginal edge of the tabletop adjacent the reference plane in position paralleling the latter.

13 Claims, 14 Drawing Figures

U.S. Patent  Dec. 31, 1985  Sheet 1 of 4  4,561,478
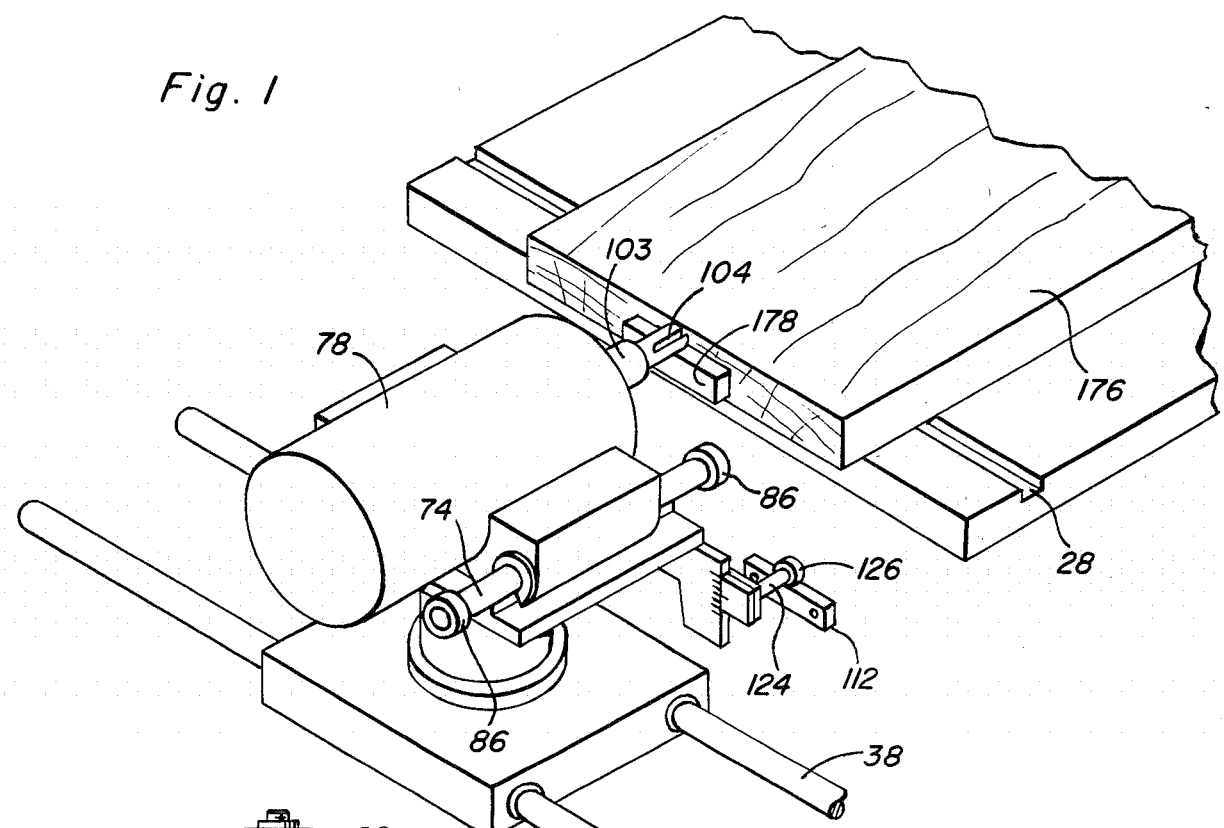
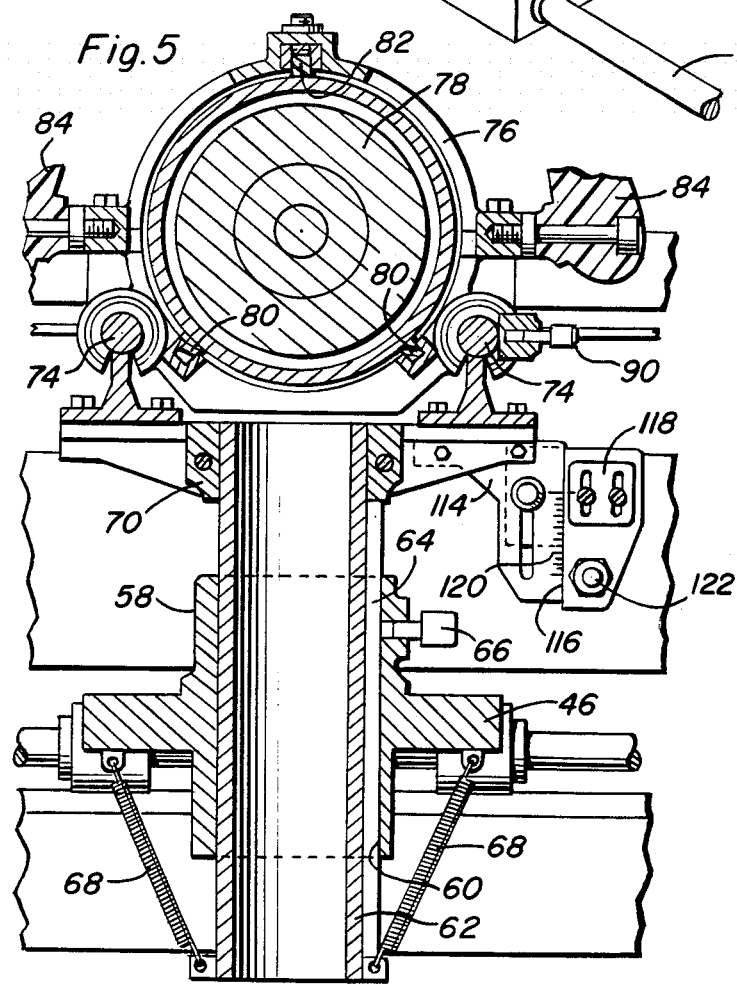
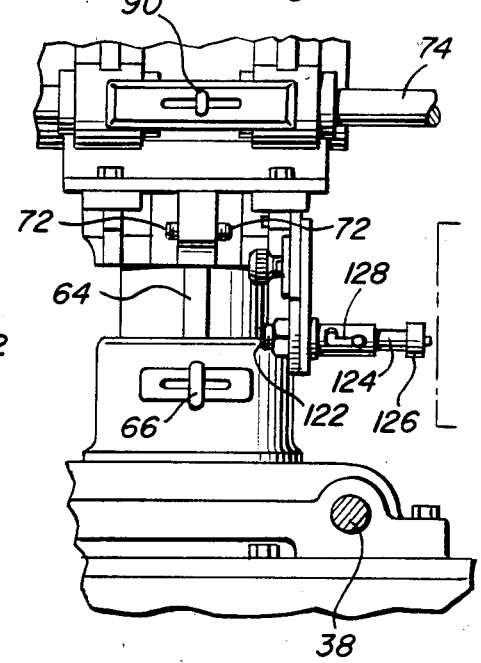

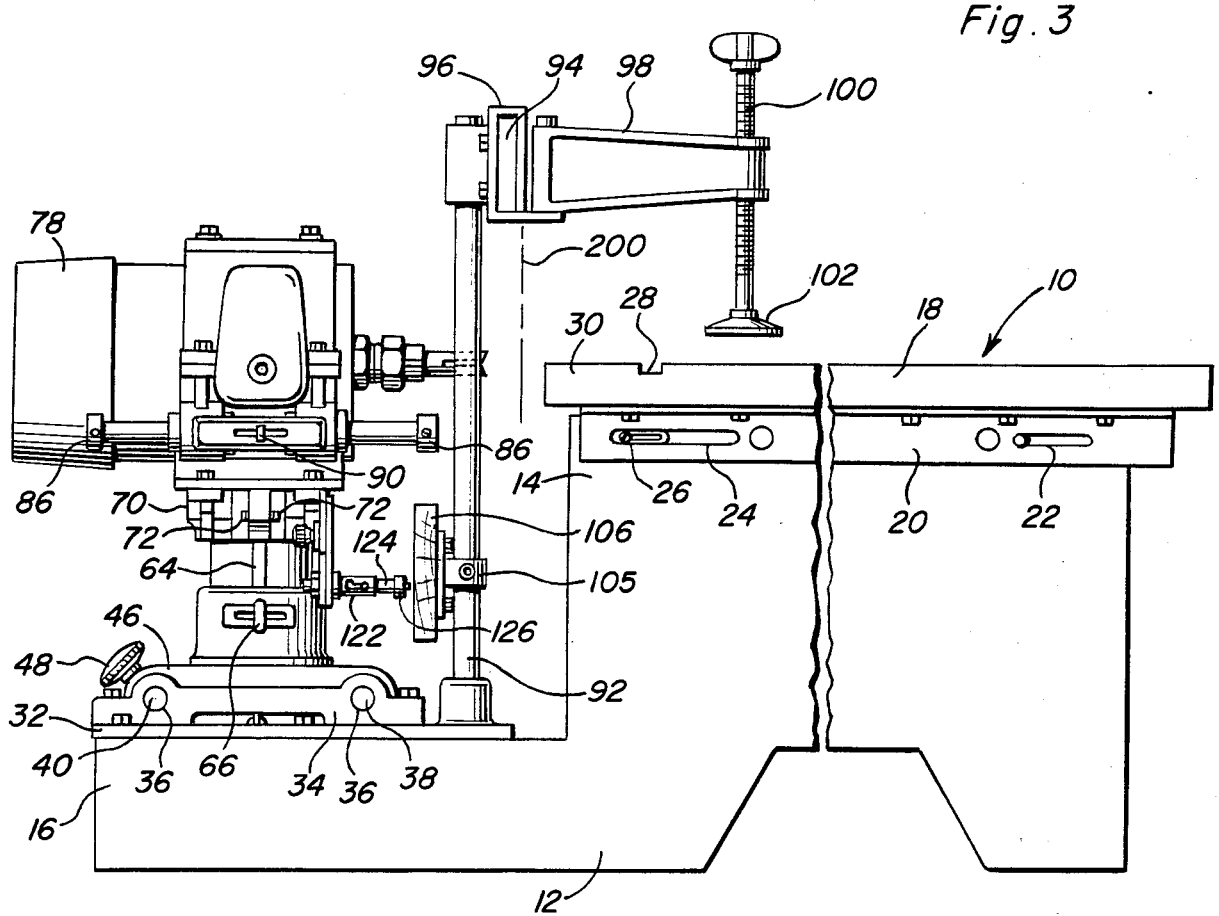

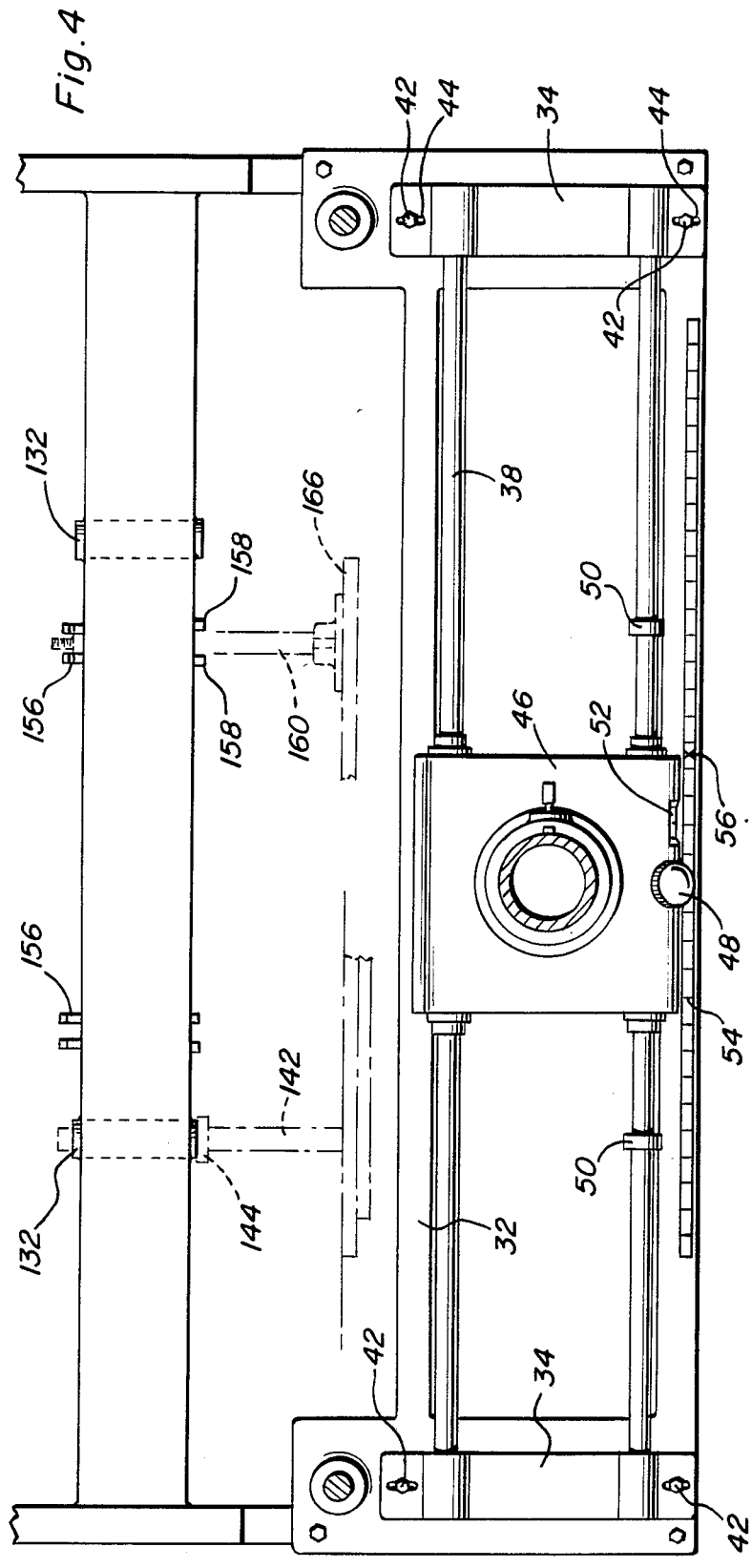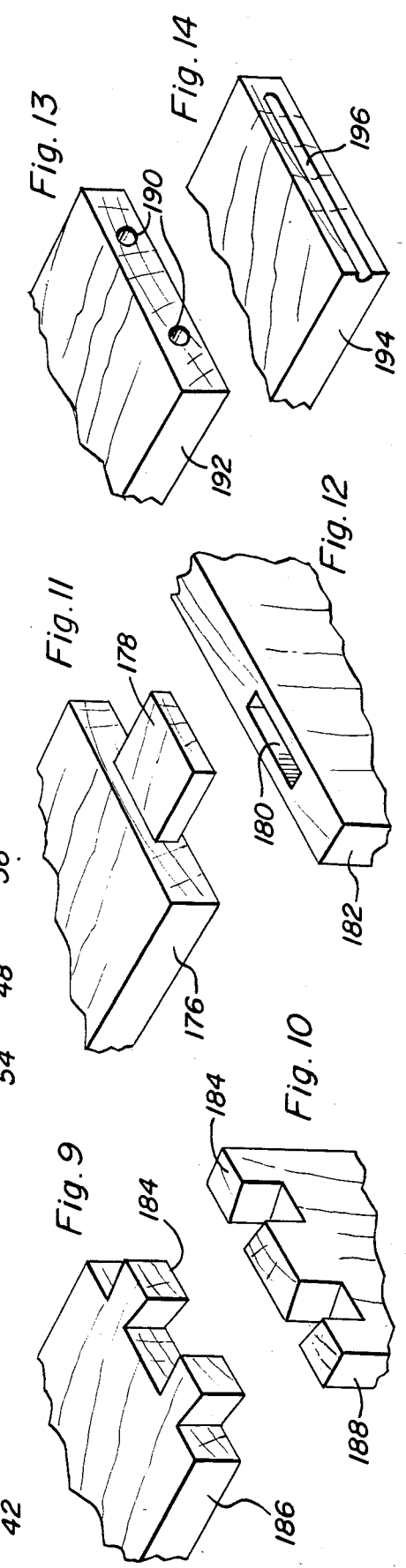

ROUTER JOINTING FIXTURE

BACKGROUND OF THE INVENTION

In normal use a hand router is guided along the surface (face) of a workpiece and relies upon such surface for support and stability of the router during cutting operations. Stability becomes marginal when the width of the surface engaged by the router is less than 2 inches and particularly when the router is moved along that surface to a position projecting from one end thereof. Accordingly, operation of a hand router under such conditions can be dangerous and accuracy of the "cut" made by the router may be unsatisfactory due to inadvertent router "tipping" on such a narrow surface. Therefore, a need exists for structure by which a router may perform various cutting operations on a workpiece and which will function to guide relative movement between the workpiece and the router in a stable manner during a cutting operation, independent of the size of the surface of the workpiece being cut by the router.

Examples of router supports and other similar devices including some of the general structural and operational features of the instant invention are disclosed in U.S. Pat. Nos. 3,541,922, 3,779,294, 4,024,898, 4,114,664 and 4,248,282.

BRIEF DESCRIPTION OF THE INVENTION

The router jointing fixture of the instant invention includes structure for supporting a workpiece and a router for relative guided movement during a workpiece cutting operation and in a manner whereby stability of the workpiece and the router during a workpiece cutting operation is assured, independent of the size of the surface of the workpiece being cut by the router.

The fixture is operative to support a workpiece from a horizontal support surface and to support an associated router with the router shaft paralleling the plane of the support surface and shiftable in all directions in a plane normal to the shaft. In addition, the fixture also supports the router for shifting along a path coinciding with the center axis of the router shaft and the fixture further includes a stationary template mount and follower structure stationary, but adjustable relative the router for movement therewith. Thus, the follower may be engaged with and move along a template for making a desired cut on a workpiece stationarily supported from the aforementioned support surface.

The main object of this invention is to provide a jointer fixture which will be capable of making precision cuts in a workpiece through the utilization of a shiftably supported router and wherein relative movement between the supported router and the workpiece may be precisely guided.

Another object of this invention is to provide a router fixture which may be used in two different modes of operation with a first mode incorporating movement of the router relative to a fixed workpiece and the second mode of operation incorporating movement of the workpiece relative to a fixed position of the router.

Still another important object of this invention is to provide a router jointing fixture including various adjustment features thereof operational to insure precise orientation of a router cut in a workpiece and precise dimensional limits of cuts being made in a workpiece.

Yet another object of this invention is to provide a router jointing fixture which will enable similar cuts to be made in successive workpieces with ease and with assurance that each cut in successive workpieces will be the same as the cut made in a previous workpiece.

A final object of this invention to be specifically enumerated herein is to provide a router jointing fixture in accordance with the preceding objects and which will conform to conventional forms of manufacture, be of simple construction, and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 a schematic view of a router supported from the fixture of the instant invention and in the process of making tenon on one end of an adjacent workpiece;

FIG. 3 is a side elevational view of the fixture as seen from the right side of FIG. 2;

FIG. 4 is a fragmentary horizontal sectional view taken substantially upon the plane indicated by the section line 4—4 of FIG. 2 and with the template mounting board and supports therefor removed;

FIG. 5 is a fragmentary enlarged vertical sectional view illustrating the manner in which the router supporting structure is mounted for unidirectional movement in a plane normal to the axis of rotation of the shaft of the router and also reciprocal along a path coinciding that with that axis;

FIG. 6 is a fragmentary side elevational view of the assemblage illustrated in FIG. 5;

FIG. 7 is a fragmentary vertical sectional view of the marginal portion of the workpiece supporting table adjacent the router and illustrating operative and inoperative positions of a workpiece alignment bar in solid and phantom lines;

FIG. 8 is a fragmentary vertical sectional view similar to FIG. 7 but illustrating a removable auxiliary fence in operative associated with the support table replacing the workpiece alignment bar;

FIGS. 9 and 10 are fragmentary perspective views of typical through dovetail components which may be formed through the use of the fixture;

FIGS. 11 and 12 are fragmentary respective views illustrating typical mortise and tenon joint components which may be formed through the utilization of the fixture;

FIG. 13 is a fragmentary perspective view illustrating typical end bores which may be formed in a workpiece; and FIG. 14 is a fragmentary perspective view of a workpiece having a spline groove formed therein as a result of the second mode of operation of the fixture.

DETAILED DESCRIPTION OF THE INVENTION

Figure 2:
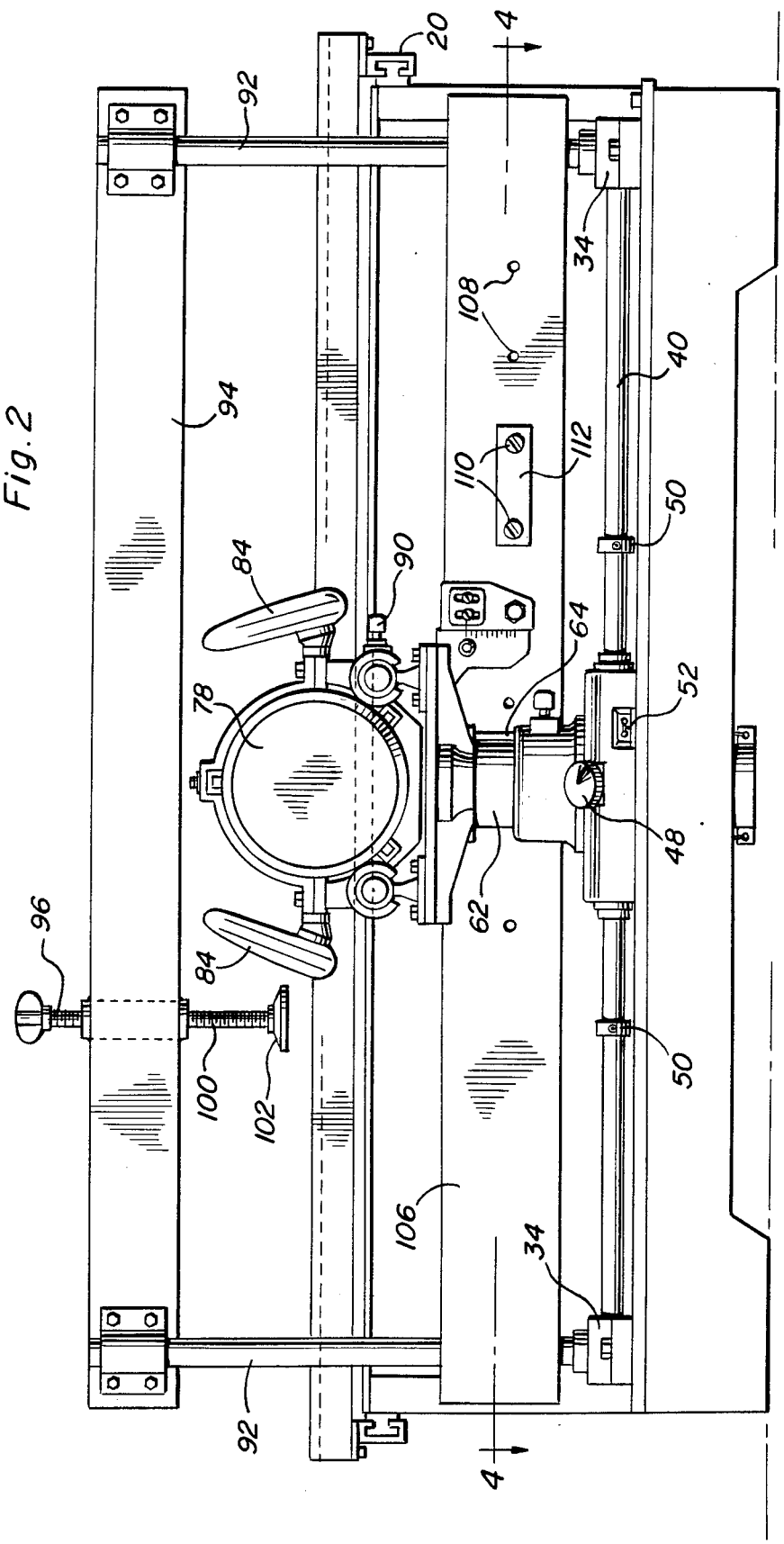
FIG. 2 is a front elevational view of the fixture.

Referring now more specifically to the drawings, the numeral 10 generally designates the router jointing fixture of the instant invention. The fixture 10 includes a main frame 12 including first and second support portions 14 and 16. The support portion 14 mounts a horizontal tabletop 18 therefrom through the utilization of a pair of opposite side channel members 20 and each of the channel members 20 is slidably supported from the frame 12 for a limited front to rear shifting by pin and slot connections 22 and 24 between the frame 12 and the channel members 20, the pin and slot connections including structure 26 by which the angle irons 20 may be secured in adjusted shifted positions. The tabletop 18 includes an upwardly opening transverse groove 28 formed in its forward marginal portion 30 and the plan shape and size of the tabletop 18 may be as desired.

The support portion 16 supports a mounting frame 32 therefrom and the mounting frame includes a pair of opposite side mounting blocks 34 supported therefrom. The mounting blocks 34 include aligned pairs of horizontal bores 36 formed therethrough in which the opposite ends of a pair of mounting rods 38 and 40 are anchored. In addition, the mounting blocks 34 are secured to the mounting frame 32 by bolts 42 secured through front to rear extending slots 44 formed in the front and rear ends of the blocks 34. Thus, the mounting rods 38 may be adjusted so as to be disposed in parallel vertical planes paralleling the front marginal edge of the tabletop 18 and the groove 28.

A base 46 is mounted on the rods 38 and 40 for guided adjustment therealong and the base 46 includes a manually adjustable friction lock 48 which may be utilized to frictionally retain the base 46 in adjusted position along the rods 38 and 40. Set screw equipped stop collars 50 are mounted on the rod 40 and may be adjusted therealong in order to define limits of movements of the base 46 along the rods 38 and 40. In addition, the base 46 includes a hairline 52 registrable with a scale 54 extending along the front marginal portion of the mounting frame 32 and including a center indicia 56.

The base 46 includes an upstanding vertical sleeve portion 58 including a keyway 60 and a cylindrical post 62 is slidingly received through the sleeve portion 58 and includes a spline 64 slidable in the keyway 60. Further, sleeve portion 58 includes a manually operable cam lock 66 for releasably locking the cylindrical post in adjusted shifted position within the sleeve portion 58 and a pair of tension springs 68 are operably connected between the base 46 and the post 62 for spring supporting the post 62 relative to the base 46.

The upper end of the post 62 mounts a head structure 70 on the upper end thereof by releasable clamp structure and the head 70 includes a keyway (not shown) wider than the spline 64 in which the latter is received and a pair of set screws 72 are provided on the head structure 70 and engageable with the spline 64 in order to slightly angularly adjust the head structure 70 on the upper end of the post 62.

The head structure 70 supports a pair of guide rails 74 therefrom to be adjusted, via the set screws 72, to be disposed in parallel vertical planes disposed normal to parallel vertical planes containing the rods 38 and 40.

Support structure in the form of a cradle 76 is guidingly supported from the rails 74 and is operative to support a router 78 therefrom, the support structure or cradle 76 including two stationary replaceable nylon or other similar material inserts and an upper set screw adjustable insert 82 for clampingly supporting the router 78 within the cradle 76. Further, the cradle 76 includes a pair of laterally outwardly projecting handles 84 to be used for shifting the cradle 76 along the rods 74, the base 46 along rods 38 and 40 and the post 62 through sleeve portion 58.

The rails 74 each include set screw equipped stop collars 86 mounted on the opposite end portions thereof and these stop collars as well as the stop collars or sleeves 50 may be used to adjustably limit movement of the router 78 transversely of the front of the table top 18 and inward toward and outward away from the tabletop 18. Further, the cradle 76 includes a lever action lock 90 supported therefrom which may be used to releasably retain the cradle 76 in position along the rails 74.

A pair of rigid uprights 92 are supported from the mounting frame 32 between the mounting base 34 and the support portion 14 and an upper horizontal transverse mounting bar 94 extends between and is mounted from the upper ends of the uprights 92. A plurality of slides are mounted on the bar 94 for adjustable position therealong and each of the slides 96 swingably supports the base end of a clamp arm 98 therefrom for angular displacement about a vertical axis. The free end of each clamp arm 98 threadingly receives an upstanding clamp screw 100 therethrough whose lower end is equipped with a horizontally enlarged foot 102 and which may be variously positioned over the tabletop 18.

The router 78 includes a horizontal rotary output shaft 103 disposed normal to vertical planes containing the center lines of the rods 38 and 40 and various router bits such as the bit 104 may be supported from the shaft 102.

It will be noted from FIG. 3 of the drawings that a pair of set screw equipped slides 105 are mounted on the uprights 92 for adjustable positioning therealong and that the slides 105 support a template mounting board or plate 106 therefrom. The forward face of the plate 106 facing the rods 38 and 40 has a plurality of threaded blind bores 108 formed therein and suitable threaded fasteners 110 may be utilized to mount various templates such as the template 112 from the plate 106.

The head structure 70 includes a depending bracket 114, see FIG. 5, from which a vertically shiftable mounting plate 116 is adjustably supported and the mounting plate 116 supports a hairline plate 118 therefrom registrable with vertical indicia 120 on the mounting plate 116. In addition, the mounting plate 116 further supports a horizontal tubular follower supporting sleeve structure 122 from which a spring biased follower head 124 is mounted. The outer end of the head 124 includes a roller follower 126 journalled therefrom and the sleeve structure 122 and head 124 enjoy a bayonet-type pin and slot connection 128 whereby the head 124 may be inwardly and angularly displaced so as to releasably retain the head 124 in retracted position. From FIG. 1 of the drawings, it may be seen that the head 124 is engageable with the template 112 to guide the router 78 during omnidirectional movement within a plane disposed normal to the rotary output shaft 102.

With attention now invited more specifically to FIG. 7 of the drawings, it may be seen that a downwardly opening channel member 130 is supported beneath and extends along the forward marginal edge portion 30 of the tabletop 18. Opposite end portions of the channel member 130 have sleeve members 132 secured transversely therethrough and the sleeve members 132 are equipped with threaded set screws 134. In addition, a horizontal plate 136 underlies the tabletop 18 and includes a forward downwardly directed vertical flange 138 having downwardly opening notches 140 formed therein registered with the sleeves 132. A pair of support rods 142 are slidably received through the sleeves 32 and the notches 140 and have adjustable threaded set screw equipped collars 144 mounted thereon. The forward ends of the rods 142 support an edge upstanding auxiliary fence 146 therefrom having a central downwardly opening notch 148 formed therein.

In addition, the flange 138 additionally includes a second pair of downwardly opening notches 150 formed therein and the depending front and rear flanges of the channel 130 include downwardly opening notches 152 and openings 154, respectively, formed therein. A pair of hook-shaped supports 156 are supported from the rear flange of the channel member 130 on opposite sides of each of the openings 154 and a pair of small laterally outwardly projecting support tangs 158 project forwardly from the forward flange of the channel member 130 on opposite sides of each of the notches 152.

A pair of tubular rods 160 are provided and include spring retracted piston-type rear end portions 162 having transverse abutments 164 threadedly engaged thereon. The forward ends of the tubular rod 160 mount a horizontal workpiece alignment bar 166 therefrom and the tubular rod 160 extends rearwardly through the notches 150 and 152 while the rear end portion 162 extends rearward through the opening 154. The abutment 164 has its opposite ends supported from the supports 156 and the midportion of the tubular rod 160 has a set screw equipped stop collar 170 adjustably mounted thereon. When the alignment bar 166 is in operation in the manner illustrated in solid lines in FIG. 7 of the drawings, the stop collar 170 rests upon the tangs 158. In order to swing the abutment bar 166 downward toward the retracted inoperative position thereof illustrated in phantom lines in FIG. 7, the abutment bar 166 is grasped and pulled forwardly so as to displace the stop collars 170 forward of the tangs 158, after which the alignment bar 166 may be swung downwardly to the phantom line position illustrated in FIG. 7.

The central portion of the forward marginal edge 30 of the tabletop 18 includes a forwardly opening notch 172 formed therein through which the bit 104 may be vertically passed when the base 46 is centered relative to the frame 32 and the notch 148 allows the bit 104 to also project through the auxiliary fence 146.

In operation, the mounting blocks 34 may be adjusted in fore and aft relation in order to allow a sharp pointed follower similar to the roller follower 126 to contact the opposite ends of a horizontally elongated template 112 mounted upon the template mounting bar or panel 106 to thus assure that the rods 38 and 40 parallel the template bar 106. Thereafter, the set screws 72 may be adjusted in order to insure that the center axis of the output shaft 104 is normal to a plane containing the forward face of the template mounting bar or panel 106 and the aforementioned pointed follower head may also be used in order to insure that the template mounting bar or panel 106 is horizontally disposed.

The collars 144 operatively associated with the auxiliary fence 146 and the collars 170 operatively associated with the workpiece alignment bar 166 may also be adjusted to insure that the fence 146 and bar 166 are disposed normal to the center axis of the shaft 102.

In the first mode of operation of the fixture 10, a workpiece 176 may be properly positioned on the tabletop 18 against the bar 166 and held in position by the clamp screws 100. Then, the abutment bar 166 may be swung to the retracted position. Thereafter, as, for example, when a tenon 178 is to be formed on the front of the workpiece 176, the follower head 124 is properly adjusted in relation to the template 112 and one of the rear collars 86 may be adjusted to the depth of the first cut to be made in making the tenon 178. Then, the collars 50 may be adjusted to allow sufficient movement of the base 146 along the rods 138 and 140 in order to cut the workpiece 176 about the tenon 178. In addition, the other collar 86 may be adjusted according to the depth of the second or final cut to be made in forming the tenon 178 by the router bit 104. At this point, the router bit 104 may be utilized to cut away the end of the workpiece 176 about the tenon 178 during the first cut thereof limited by the first rearward stop collar 86. After the first cut has been completed, the first rearward stop collar 86 may be loosened and rearwardly shifted in order that the second rearward stop collar may be used to define the limit of the final cut of the router bit 104 in forming the tenon 178.

Of course, a similar procedure may be used in forming mortise 180 in the companion workpiece 182 and other bits and templates may be used in forming the dovetail components 184 on similar workpieces 186 and 188, see FIGS. 9 and 10.

It is believed obvious that the end bores 190 illustrated in the workpiece 192 of FIG. 13 may be readily formed by properly stationarily adjusting the base 46 and the post 62 and thereafter properly positioning the workpiece 192 through utilization of the auxiliary fence 146. Thereafter, the fore and aft movement of the cradle 76 is all that is needed in forming each of the bores 190, adjustment of the base 46 along the rods 38 and 40 being required subsequent to forming the first bore 190 and preparatory to forming the second bore 190. Further, when the bores 190 are being formed, the stop collars 50 may be used to limit shifting of the base 46 along the rods 38 and 40 in order to enable repeat operations in additional workpieces. Finally, in the second mode of operation of the fixture 10, the router 78 may be adjusted as desired and stationarily maintained in position with the router bit 104 projecting through the notch 148. Thereafter, a workpiece such as workpiece 194 in FIG. 14 may have spline groove 196 formed therein by moving workpiece 194 along the auxiliary fence 146.

Of course, the alignment bar 166 and auxiliary fence 146 are separately used. In addition, the groove 28 may be used to guidingly support a mitre gauge from the table top 18.

The springs 68 are of sufficient strength to support not only the weight of the post 62 but also the head structure 70 and the router 78. Accordingly, little effort is required to vertically shift the router 78 when such vertical movement is required. Further, various different followers 126 may be used, as desired.

It is believed apparent that the fixture 10 defines a vertical plane 200 which parallels the forward marginal edge of the table 18 and that the router 78 is disposed on the side of the plane 200 remote from the tabletop 18. Movement of the base 46 along the rods 38 and 40 defines a first path of movement of the router and movement of the post 62 through the sleeve portion 58 defines a second path of movement of the router 78 disposed at right angles relative to the first mentioned path and with both of these paths being disposed in a plane which parallels the reference plane 200 and is disposed normal to the center axis of the rotary output shaft 102. Further, movement of the router along the guide rails 74 shifts the router 78 in a third path normal to the reference plane to thus enable the bit 104 to pass through the reference plane 200 and engage the workpiece 176.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A router jointing fixture including first and second relatively stationarily located support portions, said first support portion including means for stationarily supporting a workpiece therefrom in selected position adjacent and relative to a reference plane, a router, router support structure for supporting said router therefrom in position on the side of plane remote from said first support portion and with the rotary shaft of said router disposed normal to said plane and projecting toward the latter, first support means mounting said router support structure from said second support portion for omnidirectional shifting in a second plane paralleling said reference plane, said support structure including second support means mounting said router from said router support structure for adjustable positioning along a path disposed normal to said planes, a template support stationary with said first support portion and a follower stationarily mounted from said router support structure and engageable with a template mounted on said template support for guiding shifting of said router support structure in said second plane, limit means operatively associated with said router and router support structure for adjusting limiting shifting of said router relative to said router support structure along said path toward said reference plane.

2. The router jointing fixture of claim 1 wherein said reference plane is vertically disposed.

3. The router jointing fixture of claim 1 wherein said first support portion includes a workpiece mounting surface against which a workpiece may be clamped and disposed normal to said reference plane.

4. The router jointing fixture of claim 3 including means mounting said mounting surface for adjustable shifting relative to said first support portion along a path normal to said reference plane.

5. The router jointing fixture of claim 1 including means mounting said follower from said router support structure for predetermined adjustable positioning relative to the latter along an adjustment path paralleling said reference plane and disposed normal to the first mentioned path.

6. A router jointing fixture including first and second relatively stationarily located support portions, said first support portion including means for stationarily supporting a workpiece therefrom in selected position adjacent and relative to a reference plane, a router, router support structure for supporting said router therefrom in position on the side of plane remote from said first support portion and with the rotary shaft of said router disposed normal to said plane and projecting toward the latter, first support means mounting said router support structure from said second support portion for omnidirectional shifting in a second plane paralleling said reference plane, said support structure including second support means mounting said router from said router support structure for adjustable positioning along a path disposed normal to said planes, a template support stationary with said first support portion and a follower stationarily mounted from said router support structure and engageable with a template mounted on said template support for guiding shifting of said router support structure in said second plane, limit means operatively associated with said router and router support structure for adjustably limiting shifting of said router relative to said router support structure along said path toward said reference plane, said limit means including a pair of independently adjustable and releasable limit stops successively engageable by said router support structure during its movement along said first path toward said reference plane.

7. The router jointing fixture of claim 6 wherein said first support portion includes a workpiece mounting surface against which a workpiece may be clamped and disposed normal to said reference plane.

8. The router jointing fixture of claim 7 including means mounting said mounting surface for adjustable shifting relative to said first support portion along a path normal to said reference plane.

9. A router jointing structure including support means defining a reference plane and a support surface disposed normal to said plane on one side thereof for supporting a workpiece therefrom stationarily relative to said plane, a router including a rotary output shaft normal to said plane, means mounting said router relative to said support means on the other side of said plane for adjustable shifting along two right angularly disposed paths contained in a plane paralleling said reference plane and normal to said shaft and for adjustable shifting of said router along a third path coinciding with the center axis of said shaft, means adjustably limiting movement of said router in opposite directions along each of said path.

10. The router jointing structure of claim 9 wherein one of said right angularly disposed straight path comprises a vertical path.

11. The router jointing structure of claim 10 including spring means operatively connected to said router for upwardly yieldingly biasing the latter along said one path.

12. The router jointing structure of claim 9 including means operative to releasably retain said router in adjusted shifted position along each of said paths.

13. The router jointing structure of claim 9 wherein said support surface includes a marginal edge thereof paralleling said reference plane, a pair of selectively usable panel members, means operative to releasably support a selective panel member in position paralleling said reference plane and in adjusted spaced relative to said marginal edge.

* * * * *